United States Patent
Snyder, III et al.

(10) Patent No.: US 12,470,566 B1
(45) Date of Patent: Nov. 11, 2025

(54) CONSTRAINT-BASED RESOURCE PLANNING FOR SERVER CLUSTERS

(71) Applicant: Confluent, Inc., Mountain View, CA (US)

(72) Inventors: Thomas George Snyder, III, New York, NY (US); Deyu Jiao, Seattle, WA (US); Prachetaa Raghavan, Sammamish, WA (US); Ajit Yagaty, Sammamish, WA (US); Roger Hoover, San Mateo, CA (US); Daniel Raymond LaMotte, WaKeeney, KS (US)

(73) Assignee: Confluent, Inc., Mountain View, CA (US)

( * ) Notice: Subject to any disclaimer, the term of this patent is extended or adjusted under 35 U.S.C. 154(b) by 0 days.

(21) Appl. No.: 18/999,167

(22) Filed: Dec. 23, 2024

(51) Int. Cl.
  *H04L 9/40* (2022.01)
(52) U.S. Cl.
  CPC .................. *H04L 63/105* (2013.01)
(58) Field of Classification Search
  CPC .................................................. H04L 63/105
  USPC ........................................................... 726/4
  See application file for complete search history.

(56) References Cited

U.S. PATENT DOCUMENTS

| | | | | |
|---|---|---|---|---|
| 2006/0173999 A1* | 8/2006 | Rider | ...................... | H04L 63/10 709/225 |
| 2015/0178107 A1* | 6/2015 | Gummaraju | ........ | G06F 9/45558 718/1 |
| 2019/0138654 A1* | 5/2019 | Arora | .................. | G06F 9/45558 |
| 2019/0222655 A1* | 7/2019 | Ko | ....................... | H04L 41/5058 |

FOREIGN PATENT DOCUMENTS

| | | | | | |
|---|---|---|---|---|---|
| CN | 117952582 | A | * | 4/2024 | ............. G06F 21/55 |
| EP | 3292468 | B1 | * | 11/2020 | ............. H04L 67/60 |
| EP | 3786860 | A1 | * | 3/2021 | ........... G06Q 10/047 |
| JP | 2018514839 | A | * | 6/2018 | .......... G06F 11/3495 |
| KR | 20190094070 | A | * | 8/2019 | ............ G06F 9/5061 |
| WO | WO-02061535 | A2 | * | 8/2002 | ............. G06Q 30/02 |
| WO | WO-2017191489 | A1 | * | 11/2017 | ........... G06F 9/5072 |
| WO | WO-2023008080 | A1 | * | 2/2023 | ............ H04W 72/40 |
| WO | WO-2024227166 | A1 | * | 10/2024 | ......... G06Q 10/0631 |

* cited by examiner

*Primary Examiner* — Aubrey H Wyszynski
(74) *Attorney, Agent, or Firm* — Schwegman Lundberg & Woessner, P.A.

(57) ABSTRACT

When a resource is being deployed to the cloud, there are many possible locations for the deployment. When a resource is created, it is placed under a parent resource. As discussed herein, a system for applying constraints to resources is used. A constraint is a type of metadata that helps manage, identify, organize, and filter resources. Defined constraints are a set of constraints that, for a particular resource, are either set or not set. Custom constraints are key/value pairs that have predefined keys, but variable values. New constraints may be added to the system without modifying source code. When a resource creation request is received, constraints of the resource being created are checked against the constraints of the candidate parent resources. The resource is then deployed to a parent resource for which it does not violate any constraints.

20 Claims, 8 Drawing Sheets

| | | CONSTRAINT | | | |
|---|---|---|---|---|---|
| RESOURCE | TYPE | CONSTRAINTS | CUSTOM | CREATED | UPDATED |
| NR-123 | NETWORK | PRIVATE_SHARED | {"TESTING":["SCHMOE", "JOE"]} | 2022-10-31 13:20:36.70 | 2022-10-31 13:20:36.70 |
| RLM-01 | REALM | PUBLIC_SHARED | NULL | 2022-10-31 13:20:36.70 | 2022-10-31 13:20:36.70 |
| KUB-17 | PHYS CLUSTER | ENTERPRISE_MT | NULL | 2022-10-31 13:20:36.70 | 2022-10-31 13:20:36.70 |

CONSTRAINT-BASED RESOURCE PLANNING FOR SERVER CLUSTERS

TECHNICAL FIELD

The subject matter disclosed herein generally relates to placement of resources in a cloud environment. Specifically, the present disclosure addresses systems and methods for constraint-based resource planning for server clusters.

BACKGROUND

Applications may be placed in dedicated resources or in shared resources of a cloud environment. A dedicated resource is statically defined for a particular application. Accordingly, when the application is deployed to its dedicated resource, a deployment system simply determines the dedicated resource for the application and deploys the application to that resource.

A shared resource is not statically defined for a particular application. As a result, when the application is deployed, a deployment system evaluates a placement plan to determine the particular resource to which the particular application should be deployed.

BRIEF DESCRIPTION OF THE DRAWINGS

Some embodiments are illustrated by way of example and not limitation in the figures of the accompanying drawings.

FIG. 6 is a diagram of a database schema including a constraint table, according to some example embodiments.

DETAILED DESCRIPTION

Figure 1:
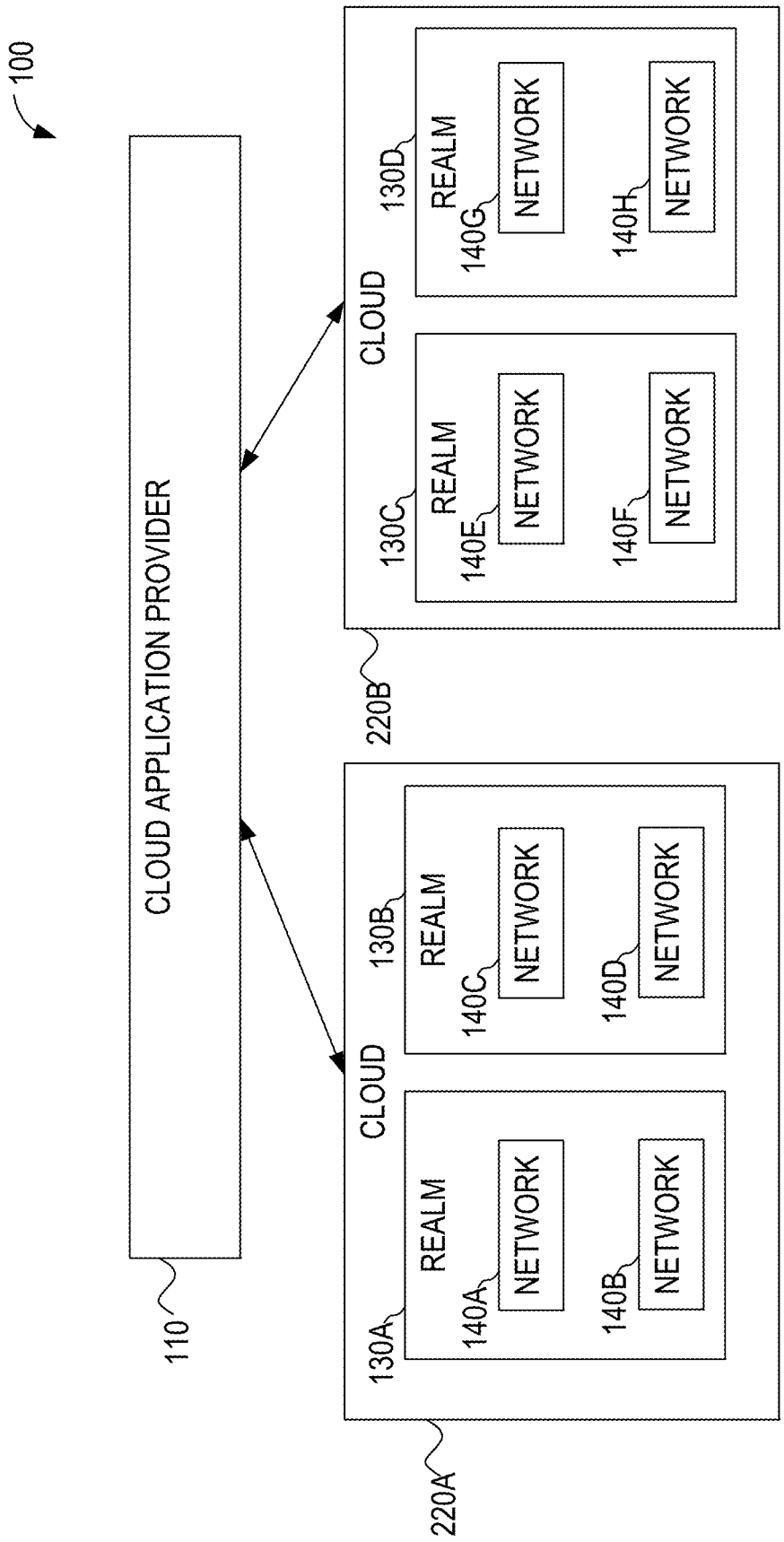
FIG. 1 is a diagram illustrating relationships among a cloud application provider, cloud service providers, realms, and networks, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

In order to flow data from an on-premises cluster to the cloud, applications or brokers running in the cloud need to establish a connection to the on-premises cluster to be able to fetch the data from the on-premises cluster. The cloud comprises a network of servers that are accessible over the Internet, and the software and databases that run on those servers.

When a resource is being deployed to the cloud, there are many possible locations for the deployment. For example, an application is executed by processors and memory in a physical cluster. The physical cluster may handle many tasks, which may be divided into logical clusters. The physical cluster is one of several physical clusters that are managed by a management system such as Kubernetes, Nomad, or Elastic Container Service (ECS). The management system executes within a network, such as a US network, a European network, or an Asian network of a cloud provider, such as Amazon Web Services (AWS), Microsoft Azure, or Google Cloud Platform. A customer of the cloud provider may use multiple accounts, referred to as realms, each of which may access one or more networks of the cloud provider.

As used herein, the generic term for a realm, network, management system, physical cluster, logical cluster, or application is "resource." When a resource is created, it is placed under a parent resource. Some resources have a dedicated placement that specifies a particular parent resource. Other resources are shared, and placement of the resource is performed based on information about the resource to be placed and the available parent resources.

The process of determining resource placement can be complicated and error-prone. Changing deployment criteria may include modification to source code that requires extensive testing and verification to ensure correct behavior. As discussed herein, a system for applying constraints to resources is used. A constraint is a type of metadata that helps manage, identify, organize, and filter resources.

Defined constraints are a set of constraints that, for a particular resource, are either set or not set. Custom constraints are key/value pairs that have predefined keys, but variable values. For example, a defined constraint for a realm may be DEFAULT. Since, in this example, DEFAULT is a defined constraint, each realm will either have the DEFAULT constraint set or it will not. As another example, TESTING may be a custom constraint. A resource may or may not have the TESTING constraint, but as a custom constraint, any value for the TESTING constraint may be defined. For example, the name of the developer that is testing the resource may be used as the value.

Constraints may be stored in a dedicated database or along with existing resource data. A dedicated database provides a centralized place to manage constraints and a dedicated service. However, since the data for the constraints are stored separately from other data for a resource, it is more likely that a modification to a resource will inadvertently not include corresponding modifications to the constraints. Storing constraint data with existing resource data encourages strong consistency when data is updated. Additionally, access controls for resource data will automatically apply to the added constraint data, simplifying user management. New constraints may be added to the system without modifying source code.

When a resource creation request is received, constraints of the resource being created are checked against the constraints of the candidate parent resources. The resource is then deployed to a parent resource for which it does not violate any constraints.

Thus, example embodiments address the technical problem of how to efficiently deploy resources to the cloud. To address the technical problem, example embodiments utilize constraints for resources that are defined as data. As a result, example embodiments provide a technical solution that, among other things, reduces the operational burden of deploying resources by improving the flexibility and reliability of the system.

FIG. 1 is a diagram 100 illustrating relationships among a cloud application provider 110; cloud service providers 120A and 120B; realms 130A, 130B, 130C, and 130D; and networks 140A, 140B, 140C, 140D, 140E, 140F, 140G, and 140H, according to some example embodiments. The various elements of FIG. 1 may be referenced by number alone. For example, "a cloud service provider 120" may be used to refer generically to either of the cloud service providers 120A-120B and "the cloud service providers 120" may be used to refer to the cloud service providers 120A-120B collectively. Similarly, "a realm 130" may be used to refer generically to any of the realms 130A-130D and "the realms 130" may be used to refer to the realms 130A-130D collectively. Likewise, "a network 140" may be used to refer generically to any of the networks 140A-140H and "the networks 140" may be used to refer to the networks 140A-140H collectively.

The cloud application provider 110 provides a cloud application to client devices and servers. The cloud application is provided by applications running on hardware computing resources of one or more cloud service providers 120. To access the cloud service providers 120, the cloud application provider 110 may use multiple accounts, each account having different access credentials (e.g., username and password). The realms 130 represent these separate methods of accessing the cloud service providers 120.

The cloud service provider 120 may provide access to multiple networks 140, such as a US network, a European network, and an Asian network. In addition to, or instead of, being divided by geography, networks may be divided by functionality. For example, the network 140A may provide access to artificial intelligence (AI) tools and the network 140B may not. After connecting to a cloud service provider 120 with an account, thus defining a realm 130, applications are deployed to hardware computing resources of a particular network 140.

Figure 2:
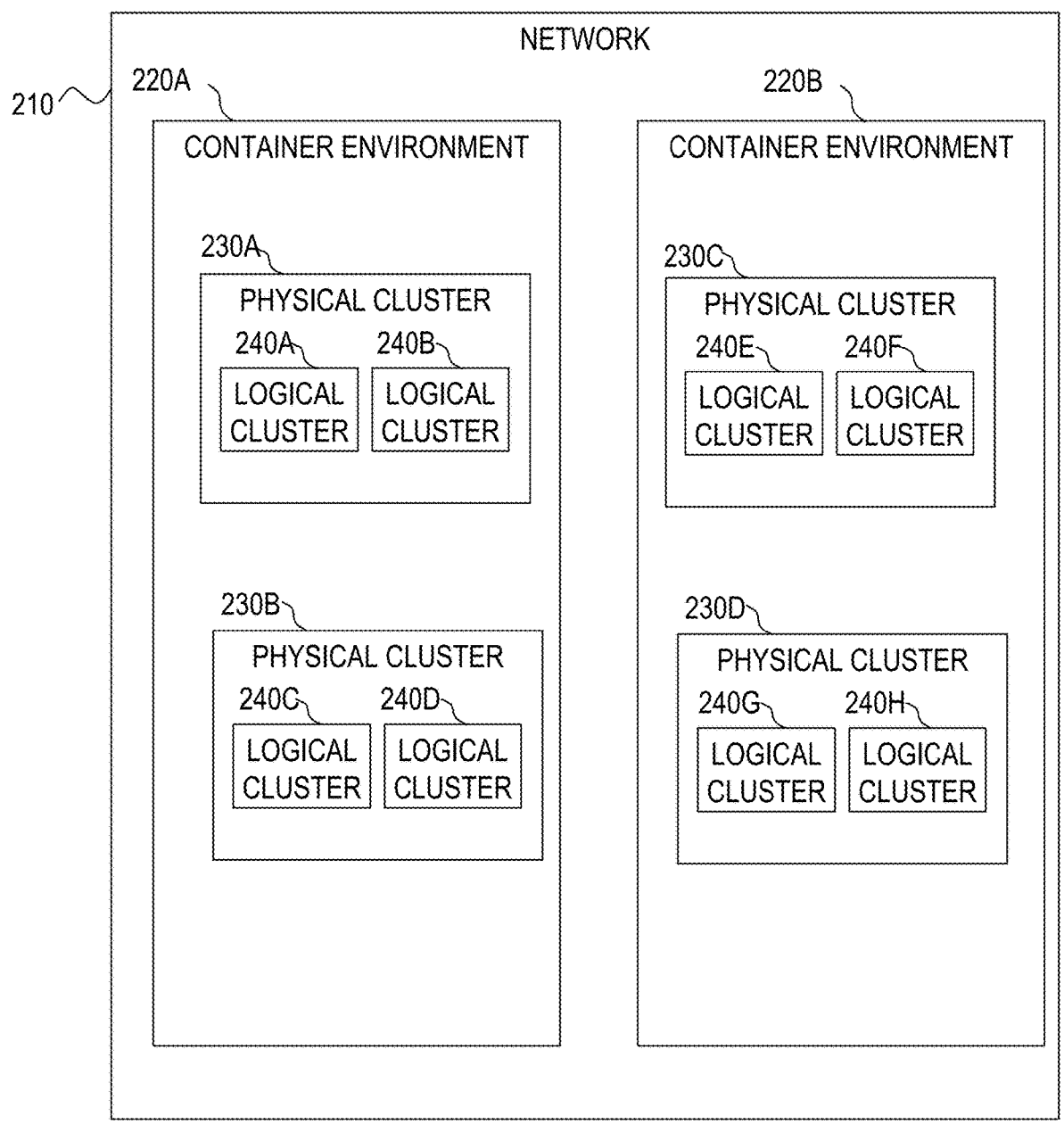
FIG. 2 is a diagram illustrating relationships among a network, container environments, physical clusters, and logical clusters, according to some example embodiments.

FIG. 2 is a diagram illustrating relationships among a network 210; container environments 220A and 220B; physical clusters 230A, 230B, 230C, and 230D; and logical clusters 240A, 240B, 240C, 240D, 240E, 240F, 240G, and 240H, according to some example embodiments. The network 210 may be one of the networks 140A-140H of FIG. 1. The various elements of FIG. 2 may be referenced by number alone. For example, "a logical cluster 240" may be used to refer generically to any of the logical clusters 240A-240H and "the logical clusters 240" may be used to refer to the logical clusters 240A-240H collectively.

The network 210 may include multiple container environments 220. For example, the container environments 220A may be separate Kubernetes clusters. The container environments 220 may each make use of multiple physical clusters 230. A physical cluster 230 comprises the actual physical computing hardware on which the application will run. The resources of a physical cluster 230 may be divided into multiple logical clusters 240. Thus, even though two containerized applications of the container environment 220A may execute on the same physical cluster 230A, they may execute in different logical clusters 240A, 240B.

As can be seen from FIGS. 1 and 2, the determination of where to deploy an application may be a complex one. The exact cloud service provider 120, realm 130, network 140, container environment 120, physical cluster 130, and logical cluster 140 may be defined by an administrator for each deployed application for static deployments. However, dynamic deployments make use of algorithmic determinations in order to reduce delay. The complexity of deployment for applications applies equally well to intermediate resources. For example, if a new container environment 120 is to be provisioned, there are many choices as to the particular cloud service provider 120, realm 130, and network 140.

Figure 3:
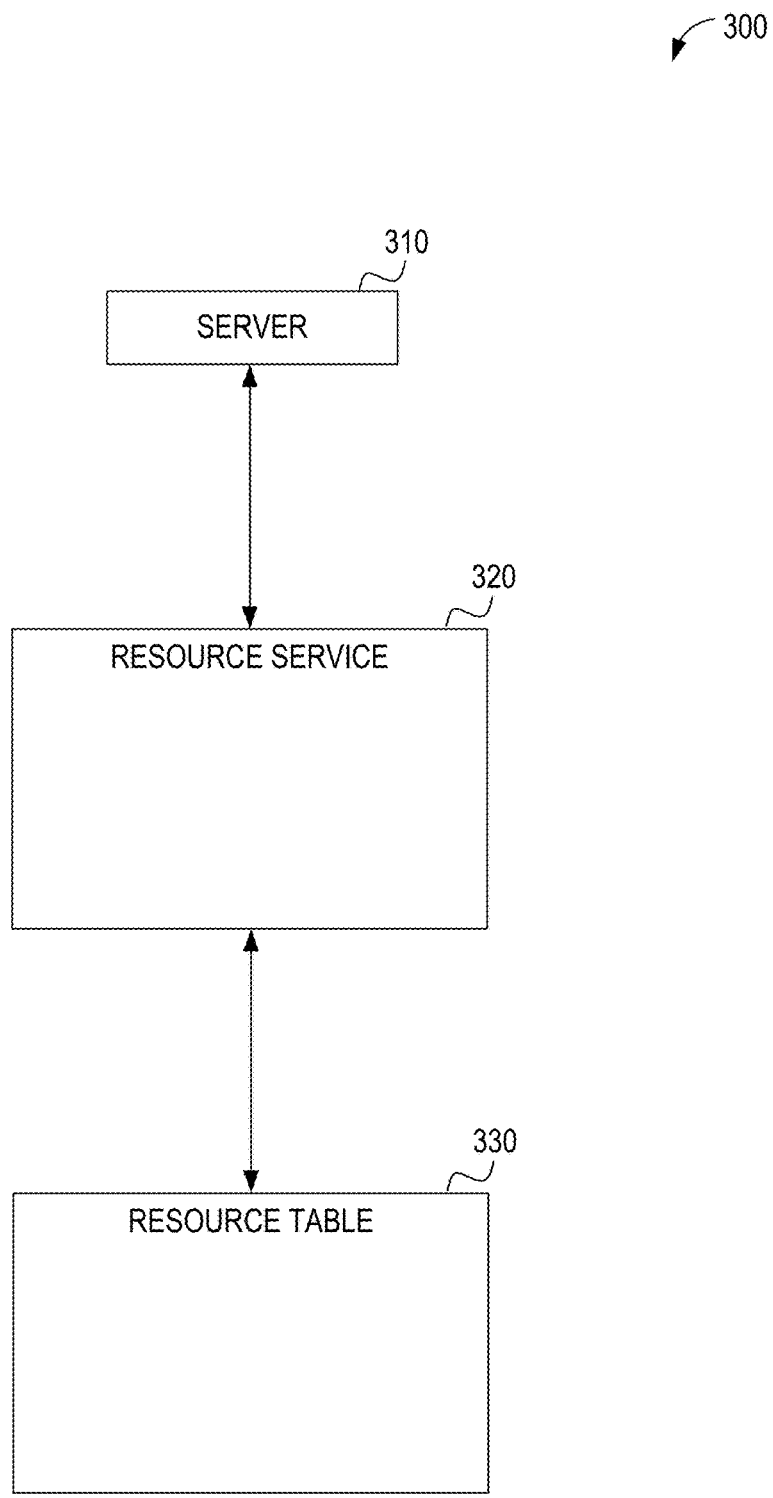
FIG. 3 is a diagram illustrating communications among a server that makes a resource creation request, a resource service, and a resource table, according to some example embodiments.

FIG. 3 is a diagram 300 illustrating communications among a server 310 that makes a resource creation request, a resource service 320, and a resource table 330, according to some example embodiments. The resource creation request identifies the resource being created and a parent resource. For example, if the resource being created is a network within a realm, the resource creation request identifies the realm and provides information about the resource. The resource service 320 receives the request and updates the resource table 330 accordingly.

Figure 4:
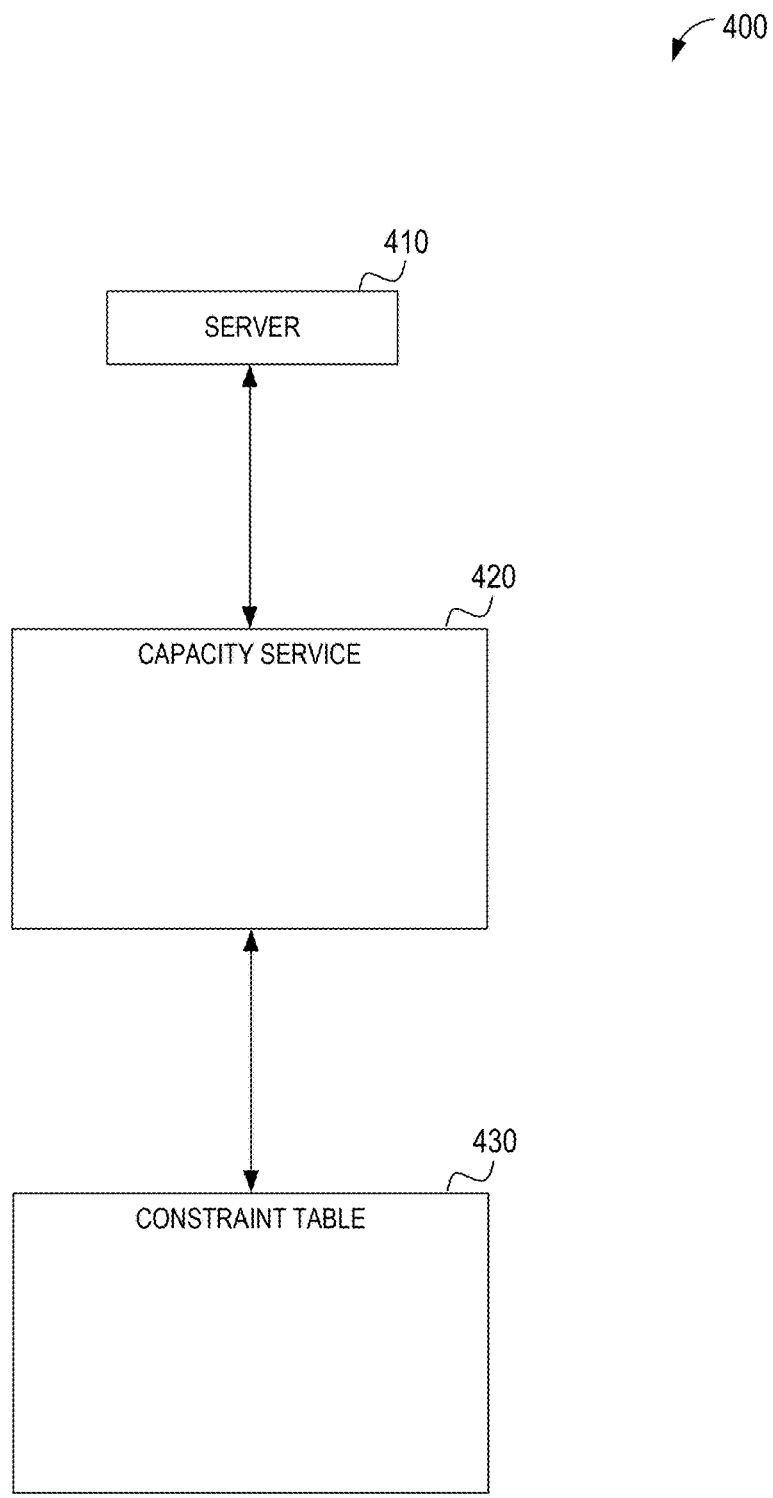
FIG. 4 is a diagram illustrating communications among a server that makes a constraint creation request, a capacity service, and a constraint table, according to some example embodiments.

FIG. 4 is a diagram 400 illustrating communications among a server 410 that makes a constraint creation request, a capacity service 420, and a constraint table 430, according to some example embodiments.

The server 410 sends a constraint creation request to the capacity service 420 to add a constraint to an existing resource. In response to the constraint creation request, the capacity service 420 updates the constraint table 530. An example application programming interface (API) for constraint creation is shown below.

```
rpc CreatePlacementConstraint
  (CreatePlacementConstraintRequest)
    returns (PlacementConstraint) { }
message PlacementConstraint {
  string resource_id=1 [(google.api.field_behavior)=RE-
    QUIRED,
    (validate.rules).string.min_len=1];
  oneof constraint_type {
    option (validate.required)=true;
    RealmConstraint realm_constraint=3
    NetworkConstraint network_constraint=4;
    KubernetesConstraint kubernetes_constraint=5;
    PhysicalClusterConstraint    physical_cluster_con-
      straint=6;
```

In the API above, a remote procedure call (rpc) is used to create a placement constraint. The rpc, named CreatePlacementConstraint, takes a CreatePlacementConstraintRequest message as a parameter and returns a PlacementConstraint message. The PlacementConstraint message includes a resource_id that identifies the resource to which the constraint applies and a constraint_type that indicates the created constraint. An example definition for the NetworkConstraint type is shown below.

```
message NetworkConstraint {
  enum Type {
    NETWORK_TYPE_UNSET=0;
```

```
// Private Shared network. Valid with 'DEFAULT'
    RealmConstraint Type.
  PRIVATE_SHARED=1 [(valid_parent_values)={in:
    [1]}];
// Public Shared network. Valid with 'DEFAULT'
    RealmConstraint Type.
  PUBLIC_SHARED=2 [(valid_parent_values)={in:
    [1]}];
// BYOC-specific network. Valid with 'BYOC'
    RealmConstraint Type.
  PUBLIC_BYOC=3    [(valid_parent_values)={in:
    [2]}];
// Flink-specific network. Valid with 'DEFAULT'
    RealmConstraint type.
  FLINK=4 [(valid_parent_values)={in: [1]}];
}
// Type of this constraint. Repeated for future expan-
    sion. repeated Type type=1
[(validate.rules) [repeated.items.enum={not in: [0]},
// Only support 1 value for now
  (validate.rules).repeated.min_items=1,
  (validate.rules).map.values.message.required=true,
  map<string, StringList>custom=2
[(validate.rules).map.values.message.required=true,
  (validate.rules).map.keys.string={in:    ["testing",
    "reserved" ]}];
}
```

An individual NetworkConstraint message will either be of type 1 or type 2. A type 1 NetworkConstraint will have one of the four enumerated types: NETWORK_TYPE_UNSET, PRIVATE_SHARED, PUBLIC_SHARED, PUBLIC_BYOC, or FLINK. A type 2 NetworkConstraint will have a key of either "testing" or "reserved," with a string value for the key. For type 1 NetworkConstraints, the restrictions on the types of parent realms on which the network can be placed are defined by the valid_parent_values parameters.

The RealmConstraint, KubernetesConstraint, and PhysicalClusterConstraint messages referenced by the PlacementConstraint message may be defined similarly to the NetworkConstraint message provided as an example.

The server 410 requests the creation of a constraint from the capacity service 420. Based on the PlacementConstraint message provided with the request, the capacity service 420 updates the constraint table 430. An example of the constraint table 430 is discussed in more detail with respect to FIG. 6, below.

Figure 5:
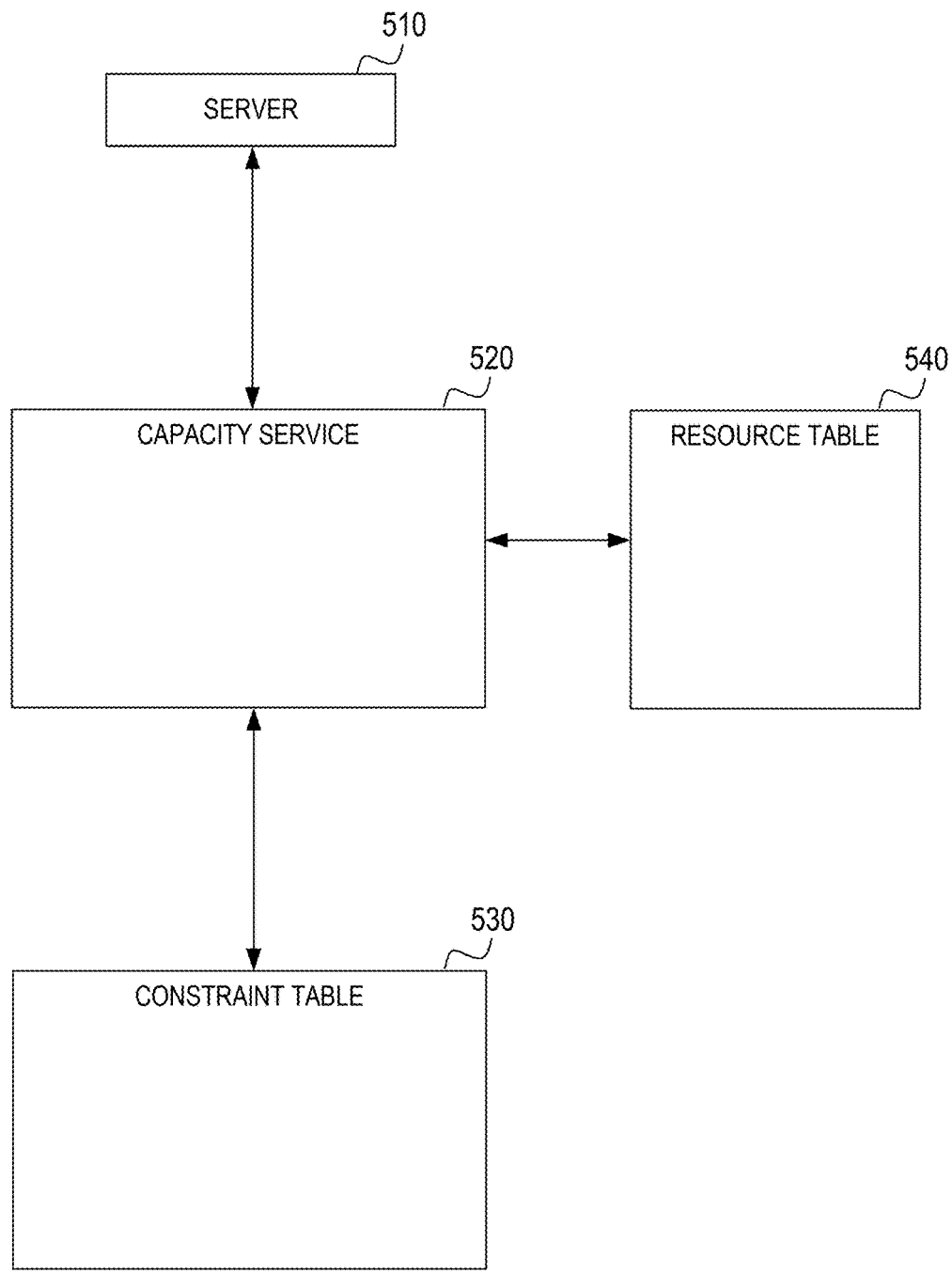
FIG. 5 is a diagram illustrating communications among a server that makes a placement request, a capacity service, a constraint table, and a resource table, according to some example embodiments.

FIG. 5 is a diagram illustrating communications among a server 510 that makes a placement request, a capacity service 520, a constraint table 530, and a resource table 540, according to some example embodiments. The placement request is made when a new resource (e.g., a realm, network, physical cluster, or logical cluster) is being placed among existing resources. Constraints on the existing resources are defined before the placement request is made.

The placement request includes one or more constraints for the resource being placed. The capacity service 520 uses the resource table 540 to determine candidate parent resources for the resource being placed (e.g., to identify a set of realms when a network is being placed).

The capacity service 520 uses the constraint table 530 to determine constraints for the candidate parent resources. Based on the constraints for the candidate parent resources and the constraint data for the resource being placed, a resource that meets the deployment constraints is determined.

The resource being placed is deployed to the determined parent resource. The resource table 540 is updated to include the placed resource.

The server 510 may make use of the capacity service 520 to make the placement request using the pseudo-code below.

```
// Find the realm to place a network on. Pass in the
    relevant realm constraints and other information.
_,                 err=s.grpcClient.GetRealm
  (ctx, &v1.GetRealmRequest{
  . . .
  ConstraintType: v1.RealmConstraint_DEFAULT,
})
```

In this example, the GetRealm function determines a realm that meets the constraints defined by a RealmRequest created by the GetRealmRequest function. The constraint includes RealmConstraint_DEFAULT. Thus, only a realm with the RealmConstraint_DEFAULT constraint would be returned by the GetRealm function in this example.

Thus, the network is provisioned on the chosen realm. The network constraints are registered using the pseudo-code below.

```
// Register the network constraints
_,       err=s.grpcClient.CreatePlacementConstraint(ctx,
    &v1.CreatePlacementConstraintRequest{
  ResourceId: "n-id",
  NetworkConstraint: &v1.NetworkConstraint{
  Type:
  [ ]v1.NetworkConstraint_Type{v1.NetworkConstraints_
    PRIVATE_SHA RED},
  },
})
```

In this example, the network is created with a resource identifier of "n-id," and a network constraint of NetworkConstraints_PRIVATE_SHARED. Thus, any container environments that will be deployed to this network will be ones that accept networks with this constraint. In some example embodiments, a one-to-one mapping of container environments to networks may be used. In such example environments, physical clusters may be deployed to networks, bypassing the intermediate step. A request to identify such a network may be implemented using the pseudo-code below.

```
// Find the network/container environment to place a
    physical cluster on. Pass in the relevant network con-
    straint and other information.
// This example uses a 1-1 mapping of networks to
    container environments.
_,               err:=s.grpcClient.GetNetwork
  (ctx, &v1.GetNetworkRequest{
  . . .
  ConstraintType:
    v1.NetworkConstraints_PRIVATE_SHARED,
})
```

The GetNetwork function identifies a network that meets the constraints identified in the NetworkRequest. Accordingly, the physical cluster is deployed to the identified network. The constraints of the physical cluster are registered, as shown by the pseudo-code below.

```
// Register the physical cluster constraint
_,             err=s.grpcClient.CreatePlacementConstraint
  (ctx, &v1.CreatePlacementConstraintRequest{
  ResourceId: "pc-id",
  PhysicalClusterConstraint:
    &v1.PhysiclClusterConstraint{
```

Type:
[    ]v1.PhysicalClusterConstraint_Type{v1.Physical ClusterConstra int_ENTERPRISE_MT},
},
})

In this example, the physical cluster is registered with a PhysicalClusterConstraint_ENTERPRISE_MT constraint. The physical cluster may be identified by a later request for placement of a logical cluster.

// Find the physical cluster to place a logical cluster on. Pass in the relevant physical cluster constraint and other information.
_,    err=s.grpcClient.GetPhysicalCluster (ctx, &v1.GetPhysicalClusterRequest{
. . .
ConstraintType:
    v1.PhysicalClusterConstraints_ENTERPRISE_MT,})

In this example, the GetPhysicalCluster call identifies a physical cluster with the PhysicalClusterConstraint_ENTERPRISE_MT constraint, and then places the logical cluster on the identified physical cluster. The logical cluster may be used for deployment of an application.

FIG. 6 is a diagram of a database schema 600 including a constraint table 610, according to some example embodiments. The constraint table 610 includes rows 630A, 630B, and 630C of a format 620. By way of example, three rows 630A-630C are shown, but the constraint table may include one row for each resource in the system.

As indicated by the format 620, each of the rows 630A-630C includes an identifier of a resource, a type of the resource, a set of binary constraints for the resource, custom constraints for the resource, a creation date for the row, and an updated date for the row.

Thus, the row 630A contains constraint data for the network resource NR-123. That resource has a PRIVATE_SHARED binary constraint and a custom constraint with a key of TESTING and a value of two strings: SCHMOE and JOE. The row 630B contains constraint data for the realm resource RLM-01. The realm resource RLM-01 has a PUBLIC_SHARED binary constraint and no custom constraints. The row 630C contains constraint data for the physical cluster resource KUB-17. The physical cluster resource KUB-17 has an ENTERPRISE_MT binary constraint and no custom constraints. All three of the rows 630A-630C were created on Oct. 31, 2022 at 13:20:36.70, and have not been updated since that time.

Two types of constraints are supported by the constraint table 610, binary constraints and custom constraints. The binary constraints in the constraints column have effect by virtue of their presence or absence. A resource that has a constraint in this column can only be deployed to a parent resource that has the same constraint. For example, a PRIVATE_SHARED network resource can be deployed only to a PRIVATE_SHARED realm resource. By contrast, both the presence and the value of a custom constraint may have meaning. For example, a network with the TESTING constraint with a value of ["SCHMOE", "JOE" ] may be deployed only to a realm that not only has the TESTING constraint, but also has the same value for the constraint.

Figure 7:
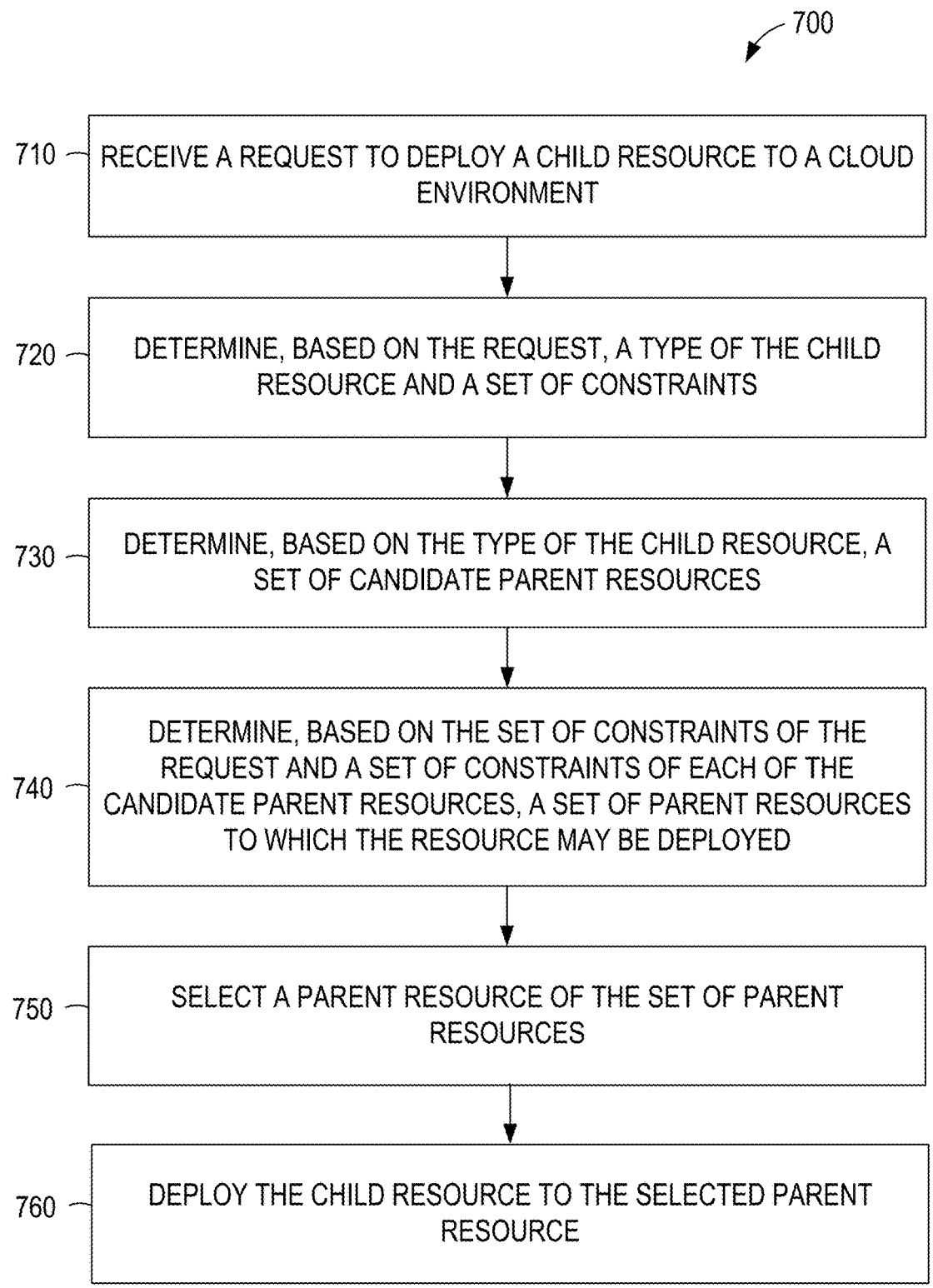
FIG. 7 is a flowchart illustrating operations of a method for deploying an application to a cloud environment, according to some example embodiments.

FIG. 7 is a flowchart illustrating operations of a method 700 for deploying an application to a cloud environment, according to some example embodiments. The method 700 includes operations 710, 720, 730, 740, 750, and 760. By way of example and not limitation, the method 700 is described as being performed by the cloud application provider 110 of FIG. 1, in communication with the cloud service providers 120A-120B, realms 130A-130D, networks 140A-140H, container environments 220A-220B, physical clusters 230A-230D, and logical clusters 240A-240H, of FIGS. 1-2.

Prior to performing the method 700, constraints for resources may be stored in a database, such as the database schema 600 of FIG. 6. For example, data for each resource may be stored in a row of a database table that includes a first field for an identifier of the resource, a second field for a list of constraints that have meaning based on their presence or absence, and a third field for a list of constraints and their values, each constraint in the list of constraints having meaning based on its value, as shown in FIG. 6.

In operation 710, the cloud application provider 110 receives a request to deploy a child resource to a cloud environment. The request identifies a type of the child resource and a set of constraints. In operation 720, the cloud application provider 110 determines, based on the request, the type of the child resource and the set of constraints. For example, the cloud application provider 110 may receive a request to deploy a network to a cloud environment, where the network should only be deployed to a realm that has a PRIVATE_SHARED constraint.

The cloud application provider 110 determines, in operation 730, based on the type of the child resource, a set of candidate parent resources. For example, if the type of the child resource is network, the set of candidate parent resources is the set of available realms, such as the realms 130A-130D. As shown in FIGS. 1-2, the resources are placed in a hierarchy, such that the type of a child resource being deployed determines the type of the candidate parent resources.

Thus, various types of resources and candidate parent resources are possible. For example, the type of the child resource may be network and the determining, based on the type of the resource, of the set of candidate parent resources may include determining a set of realms. Each realm of the set of realms may correspond to a different cloud services provider. As another example, the type of the child resource may be container environment and the determining, based on the type of the child resource, of the set of candidate parent resources may include determining a set of networks. As a third example, the type of the child resource may be physical cluster and the determining, based on the type of the child resource, of the set of candidate parent resources may include determining a set of container environments. As a fourth example, the type of the child resource may be a logical cluster and the determining, based on the type of the child resource, of the set of candidate parent resources may include determining a set of physical clusters.

The candidate parent resources may include a first candidate parent resource that is dedicated to running untrusted applications and a second candidate parent resource that is dedicated to running trusted applications. Which of these candidate parent resources the resource being deployed should be deployed to will depend on whether the resource being deployed will be used for running trusted or untrusted applications.

In operation 740, the cloud application provider 110 determines, based on the set of constraints of the request and a set of constraints of each of the candidate parent resources, a set of parent resources to which the child resource may be deployed. For example, since the child resource requires that a parent resource have a PRIVATE_SHARED constraint, the set of parent resources to which the child resource may be deployed may be limited to the realms that also have the PRIVATE_SHARED constraint. Thus, by using appropriate constraints, a trusted or untrusted network is deployed to a correspondingly trusted or untrusted realm, and so on, so that a trusted or untrusted application is ultimately deployed to a trusted or untrusted environment.

In some example embodiments, two types of constraints may be used. Constraints of the first type are binary in nature and have meaning by virtue of their presence or absence. For example, a realm that is dedicated to untrusted code may have a corresponding constraint, and a network that is dedicated to untrusted code may be deployed only to such a realm. Constraints of the second type have meaning both by virtue of their presence or absence and by their value. For example, different developers may use different sets of resources for testing. By using different values for a TESTING constraint, the sets of resources may be kept separate. Accordingly, when determining the set of parent resources in operation 740, the determining of the set of parent resources to which the resource may be deployed may be based on presence of a first constraint of the first type and a value of a second constraint of the second type.

The cloud application provider 110 selects a parent resource of the set of parent resources (operation 750). For example, when only one of the candidate parent resources meets the constraints for the request, the set of parent resources determined in operation 740 will contain only that one candidate parent resource. As a result, the one candidate parent resource will be selected in operation 750. When the set of parent resources includes multiple parent resources, one may be selected based on workload, randomly, using a round-robin distribution method, or any other means.

In operation 760, the cloud application provider 110 deploys the resource to the selected parent resource. In this example, a new network is deployed to the selected realm. Thus, using the method 700, resources are deployed to a cloud environment based on constraints, rather than by modifying source code of deployment applications or requiring administrators to make specific deployment decisions for each resource. As a result, the cloud deployment process has improved reliability and scalability.

Figure 8:
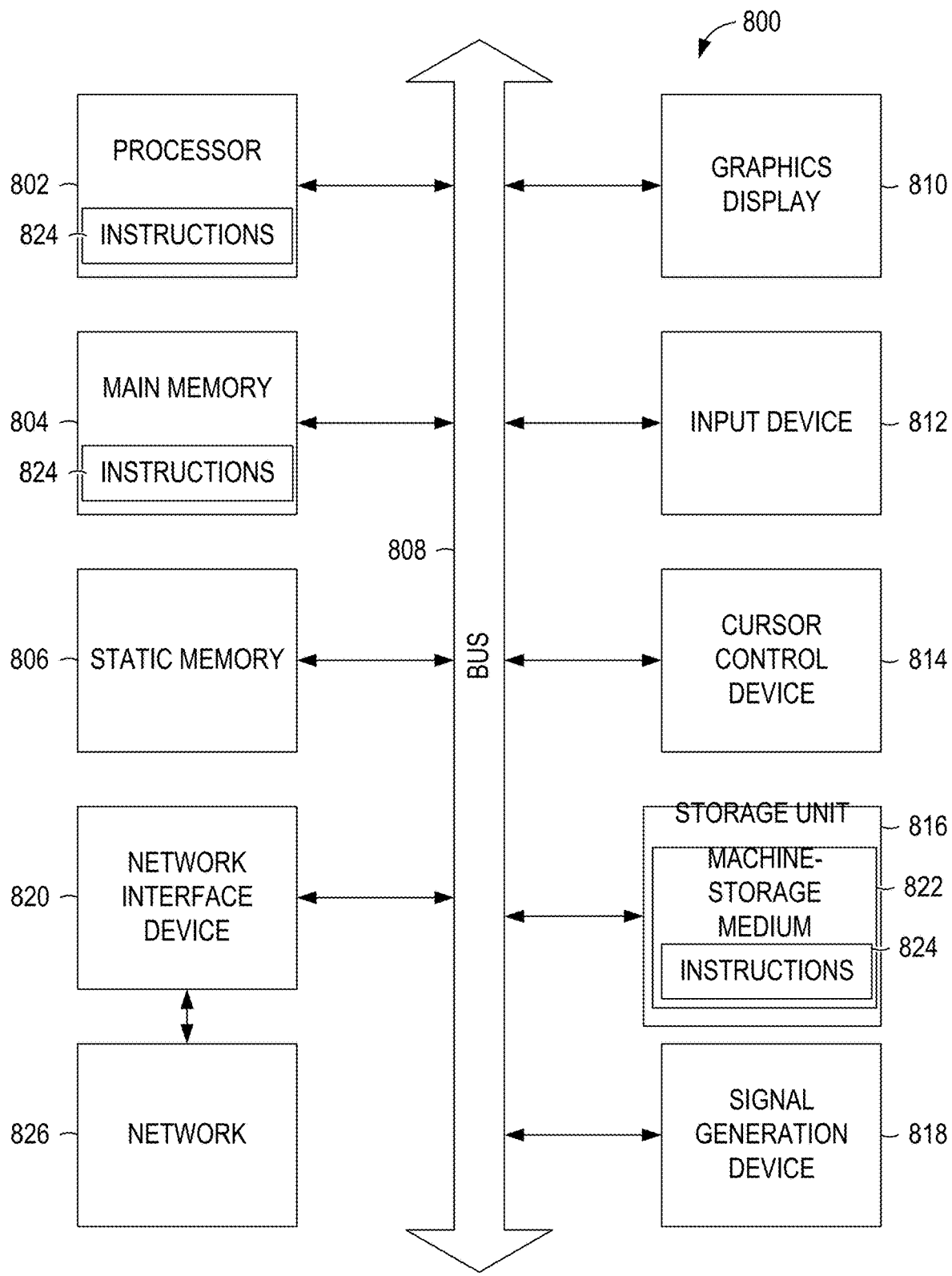
FIG. 8 is a block diagram illustrating components of a machine, according to some example embodiments, able to read instructions from a machine-storage medium and perform any one or more of the methodologies discussed herein.

FIG. 8 illustrates components of a machine 800, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagram of FIG. 7. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a device-storage medium 822 (e.g., a tangible machine-storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-storage media (e.g., tangible and non-transitory machine-storage media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

In view of the disclosure above, various examples are set forth below. It should be noted that one or more features of an example, taken in isolation or combination, should be considered within the disclosure of this application.

EXAMPLES

Example 1 is a system comprising: one or more hardware processors; and a memory that stores instructions that, when executed by the one or more hardware processors, cause the one or more hardware processors to perform operations comprising: receiving a request to deploy a child resource to a cloud environment; determining, based on the request, a type of the child resource and a set of constraints; determining, based on the type of the child resource, a set of candidate parent resources; determining, based on the set of constraints of the request and a set of constraints of each of the candidate parent resources, a set of parent resources to which the child resource may be deployed; selecting a parent resource of the set of parent resources; and deploying the child resource to the selected parent resource.

In Example 2, the subject matter of Example 1, wherein: the set of constraints of the request comprises a first constraint and a second constraint; and the determining of the set of parent resources to which the child resource may be deployed is based on presence of the first constraint and a value of the second constraint.

In Example 3, the subject matter of Examples 1-2, wherein the set of parent resources comprises a set of realms and each realm of the set of realms corresponds to a different cloud services provider.

In Example 4, the subject matter of Examples 1-3, wherein the operations further comprise: prior to the receiving of the request to deploy the child resource, storing the set of constraints of the selected parent resource in a row of a database table that comprises a first field for an identifier of the selected parent resource, a second field for a list of constraints that have meaning based on their presence or absence, and a third field for a list of constraints and their values, each constraint in the list of constraints having meaning based on its value.

In Example 5, the subject matter of Examples 1-4, wherein a first candidate parent resource of the set of candidate parent resources is dedicated to running untrusted applications and a second candidate parent resource of the set of candidate parent resources is dedicated to running trusted applications.

In Example 6, the subject matter of Examples 1-5, wherein: the type of the child resource is a network; and the determining, based on the type of the child resource, of the set of candidate parent resources comprises determining a set of realms.

In Example 7, the subject matter of Examples 1-6, wherein: the type of the child resource is a container environment; and the determining, based on the type of the child resource, of the set of candidate parent resources comprises determining a set of networks.

In Example 8, the subject matter of Examples 1-7, wherein: the type of the child resource is a physical cluster; and the determining, based on the type of the child resource, of the set of candidate parent resources comprises determining a set of container environments.

In Example 9, the subject matter of Examples 1-8, wherein: the type of the child resource is a logical cluster; and the determining, based on the type of the child resource, of the set of candidate parent resources comprises determining a set of physical clusters.

Example 10 is a method comprising: receiving, by at least one hardware processor, a request to deploy a child resource to a cloud environment; determining, based on the request, a type of the child resource and a set of constraints; determining, based on the type of the child resource, a set of candidate parent resources; determining, based on the set of constraints of the request and a set of constraints of each of the candidate parent resources, a set of parent resources to which the child resource may be deployed; selecting a parent resource of the set of parent resources; and deploying the child resource to the selected parent resource.

In Example 11, the subject matter of Example 10, wherein: the set of constraints of the child resource comprises a first constraint and a second constraint; and the determining of the set of parent resources to which the child resource may be deployed is based on presence of the first constraint and a value of the second constraint.

In Example 12, the subject matter of Examples 10-11, wherein the set of candidate parent resources comprises a set of realms and each realm of the set of realms corresponds to a different cloud services provider.

In Example 13, the subject matter of Examples 10-12 includes, prior to the receiving of the request to deploy the child resource, storing the set of constraints of the selected parent resource in a row of a database table that comprises a first field for an identifier of the selected parent resource, a second field for a list of constraints that have meaning based on their presence or absence, and a third field for a list of constraints and their values, each constraint in the list of constraints having meaning based on its value.

In Example 14, the subject matter of Examples 10-13, wherein a first candidate parent resource of the set of candidate parent resources is dedicated to running untrusted applications and a second candidate parent resource of the set of candidate parent resources is dedicated to running trusted applications.

In Example 15, the subject matter of Examples 10-14, wherein: the type of the child resource is a network; and the determining, based on the type of the child resource, of the set of candidate parent resources comprises determining a set of realms.

In Example 16, the subject matter of Examples 10-15, wherein: the type of the child resource is a container environment; and the determining, based on the type of the child resource, of the set of candidate parent resources comprises determining a set of networks.

In Example 17, the subject matter of Examples 10-16, wherein: the type of the child resource is a physical cluster; and the determining, based on the type of the child resource, of the set of candidate parent resources comprises determining a set of container environments.

Example 18 is a machine-storage medium comprising instructions that, when executed by one or more hardware processors of a machine, cause the machine to perform operations comprising: receiving a request to deploy a child resource to a cloud environment; determining, based on the request, a type of the child resource and a set of constraints; determining, based on the type of the child resource, a set of candidate parent resources; determining, based on the set of constraints of the request and a set of constraints of each of the candidate parent resources, a set of parent resources to which the child resource may be deployed; selecting a parent resource of the set of parent resources; and deploying the child resource to the selected parent resource.

In Example 19, the subject matter of Example 18, wherein: the set of constraints of the request comprises a first constraint and a second constraint; and the determining of the set of parent resources to which the child resource may be deployed is based on presence of the first constraint and a value of the second constraint.

In Example 20, the subject matter of Examples 18-19, wherein the set of parent resources comprises a set of realms and each realm of the set of realms corresponds to a different cloud services provider.

Example 21 is an apparatus comprising means to implement of any of Examples 1-20.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
one or more hardware processors; and
a memory that stores instructions that, when executed by the one or more hardware processors, cause the one or more hardware processors to perform operations comprising:
receiving a request to deploy a child resource to a cloud environment;
determining, based on the request, a type of the child resource and a set of constraints;
determining, based on the type of the child resource, a set of candidate parent resources that comprises a first candidate parent resource that is dedicated to running untrusted applications and a second candidate parent resource that is dedicated to running trusted applications;
determining, based on the set of constraints of the request and a set of constraints of each of the candidate parent resources, a set of parent resources to which the child resource may be deployed;
selecting a parent resource of the set of parent resources; and
deploying the child resource to the selected parent resource.

2. The system of claim 1, wherein:
the set of constraints of the request comprises a first constraint and a second constraint; and
the determining of the set of parent resources to which the child resource may be deployed is based on presence of the first constraint and a value of the second constraint.

3. The system of claim 1, wherein the set of parent resources comprises a set of realms and each realm of the set of realms corresponds to a different cloud services provider.

4. The system of claim 1, wherein the operations further comprise:
prior to the receiving of the request to deploy the child resource, storing the set of constraints of the selected parent resource in a row of a database table that comprises a first field for an identifier of the selected parent resource, a second field for a list of constraints that have meaning based on their presence or absence, and a third field for a list of constraints and their values, each constraint in the list of constraints having meaning based on its value.

5. The system of claim 1, wherein:
the type of the child resource is a network; and
the determining, based on the type of the child resource, of the set of candidate parent resources comprises determining a set of realms.

6. The system of claim 1, wherein:
the type of the child resource is a container environment; and
the determining, based on the type of the child resource, of the set of candidate parent resources comprises determining a set of networks.

7. The system of claim 1, wherein:
the type of the child resource is a physical cluster; and
the determining, based on the type of the child resource, of the set of candidate parent resources comprises determining a set of container environments.

8. The system of claim 1, wherein:
the type of the child resource is a logical cluster; and
the determining, based on the type of the child resource, of the set of candidate parent resources comprises determining a set of physical clusters.

9. A method comprising:
receiving, by at least one hardware processor, a request to deploy a child resource to a cloud environment;
determining, based on the request, a type of the child resource and a set of constraints;
determining, based on the type of the child resource, a set of candidate parent resources that comprises a first candidate parent resource that is dedicated to running untrusted applications and a second candidate parent resource that is dedicated to running trusted applications;
determining, based on the set of constraints of the request and a set of constraints of each of the candidate parent resources, a set of parent resources to which the child resource may be deployed;
selecting a parent resource of the set of parent resources; and
deploying the child resource to the selected parent resource.

10. The method of claim 9, wherein:
the set of constraints of the child resource comprises a first constraint and a second constraint; and
the determining of the set of parent resources to which the child resource may be deployed is based on presence of the first constraint and a value of the second constraint.

11. The method of claim 9, wherein the set of candidate parent resources comprises a set of realms and each realm of the set of realms corresponds to a different cloud services provider.

12. The method of claim 9, further comprising:
prior to the receiving of the request to deploy the child resource, storing the set of constraints of the selected parent resource in a row of a database table that comprises a first field for an identifier of the selected parent resource, a second field for a list of constraints that have meaning based on their presence or absence, and a third field for a list of constraints and their values, each constraint in the list of constraints having meaning based on its value.

13. The method of claim 9, wherein:
the type of the child resource is a network; and
the determining, based on the type of the child resource, of the set of candidate parent resources comprises determining a set of realms.

14. The method of claim 9, wherein:
the type of the child resource is a container environment; and
the determining, based on the type of the child resource, of the set of candidate parent resources comprises determining a set of networks.

15. The method of claim 9, wherein:
the type of the child resource is a physical cluster; and
the determining, based on the type of the child resource, of the set of candidate parent resources comprises determining a set of container environments.

16. A machine-storage medium comprising instructions that, when executed by one or more hardware processors of a machine, cause the machine to perform operations comprising:
receiving a request to deploy a child resource to a cloud environment;
determining, based on the request, a type of the child resource and a set of constraints;

determining, based on the type of the child resource, a set of candidate parent resources that comprises a first candidate parent resource that is dedicated to running untrusted applications and a second candidate parent resource that is dedicated to running trusted applications;

determining, based on the set of constraints of the request and a set of constraints of each of the candidate parent resources, a set of parent resources to which the child resource may be deployed;

selecting a parent resource of the set of parent resources; and deploying the child resource to the selected parent resource.

17. The machine-storage medium of claim 16, wherein:

the set of constraints of the request comprises a first constraint and a second constraint; and the determining of the set of parent resources to which the child resource may be deployed is based on presence of the first constraint and a value of the second constraint.

18. The machine-storage medium of claim 16, wherein the set of parent resources comprises a set of realms and each realm of the set of realms corresponds to a different cloud services provider.

19. The machine-storage medium of claim 16, wherein the operations further comprise:

prior to the receiving of the request to deploy the child resource, storing the set of constraints of the selected parent resource in a row of a database table that comprises a first field for an identifier of the selected parent resource, a second field for a list of constraints that have meaning based on their presence or absence, and a third field for a list of constraints and their values, each constraint in the list of constraints having meaning based on its value.

20. The machine-storage medium of claim 16, wherein:

the type of the child resource is a network; and the determining, based on the type of the child resource, of the set of candidate parent resources comprises determining a set of realms.

* * * * *